May 8, 1934.  E. R. EVANS  1,957,635
BRAKE SHOE CONSTRUCTION
Filed Dec. 24, 1928  2 Sheets-Sheet 1
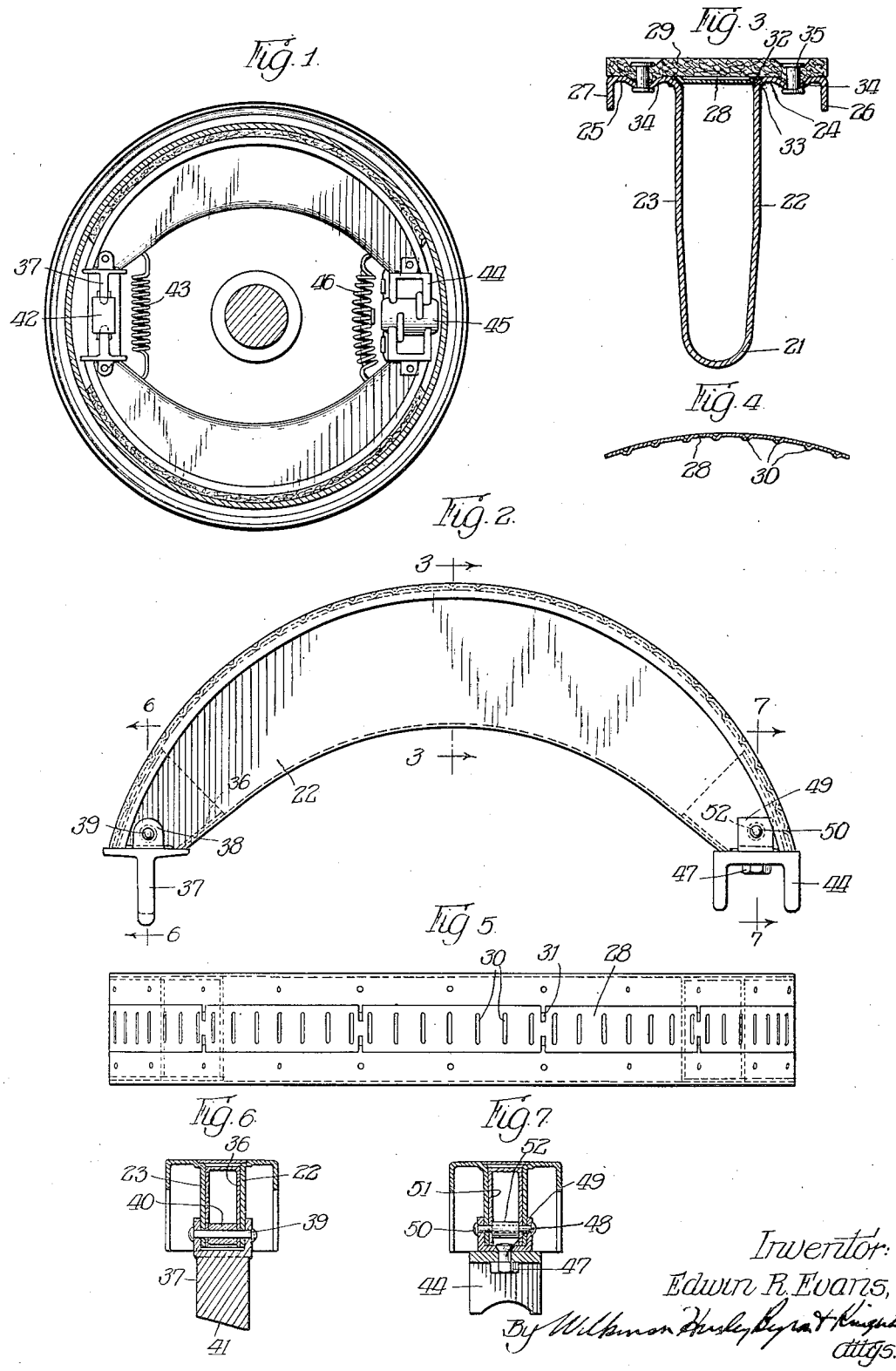

May 8, 1934.  E. R. EVANS  1,957,635
BRAKE SHOE CONSTRUCTION
Filed Dec. 24, 1928  2 Sheets-Sheet 2
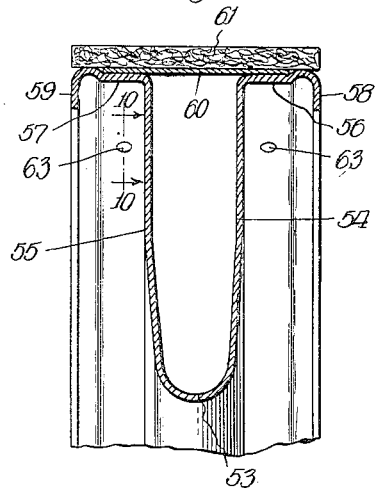
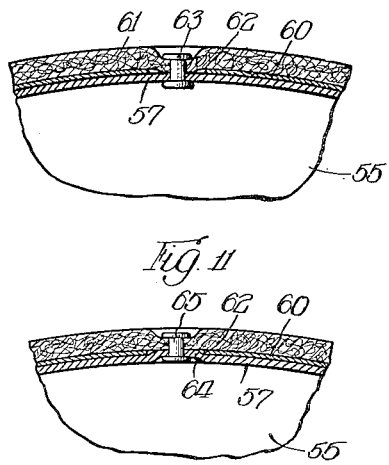
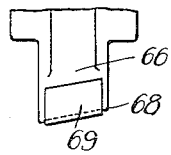
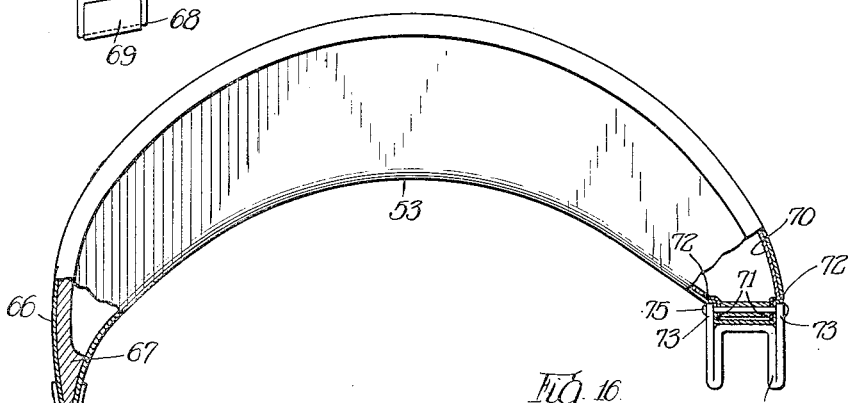
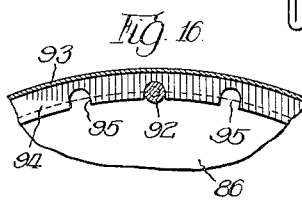
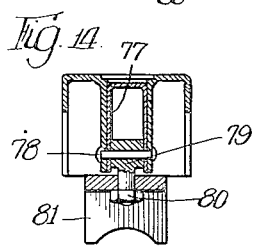
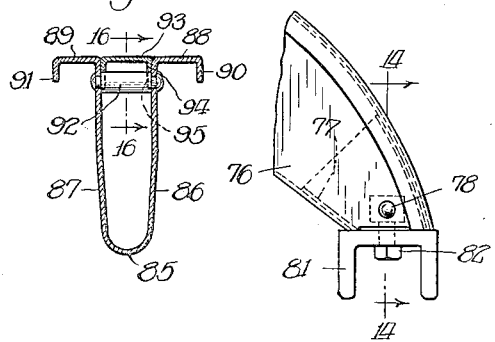
Inventor:
Edwin R. Evans,
By Wilkinson Huxley Byron & Knight
Attys Patented May 8, 1934

1,957,635

UNITED STATES PATENT OFFICE 1,957,635

BRAKE SHOE CONSTRUCTION

Edwin R. Evans, Detroit, Mich.

Application December 24, 1928, Serial No. 328,094

7 Claims. (Cl. 188—250)

This invention relates to a new and improved brake shoe construction and more particularly to a pressed metal construction for brake shoes of types adapted for use with automobiles or the like.

Brake shoes of the type used with internal expanding brakes of the automobile type must comprise an arcuate surface carrying the brake lining material and such other elements or members as will insure holding the arcuate surface substantially rigid as it is applied to the brake drum. While such shoes are generally formed of castings having integral ribs for strengthening and rendering them rigid, there have been designed certain types of shoes formed of a plurality of pressed metal sections welded together. In such constructions it is difficult to make a satisfactory welded connection between the brake surface member and the reinforcing or supporting member.

It is an object of the present invention to provide a new and improved brake shoe constructed of pressed metal.

It is a further object to provide a construction of this character in which the reinforcing or supporting structure is integral with that part of the arcuate surface to which the brake lining is secured.

It is also an object to provide a construction in which the fulcrum and bearing members may be secured externally to the pressed metal shoes.

It is an additional object to provide a pressed metal shoe in which the end of the shoe itself may serve as fulcrum member in the movement of the shoe.

It is also an object to provide a shoe in which a lighter second member may be secured to the main shoe member in such manner that the shape of the main shoe member will not be affected by the second member nor by the connection between the members.

It is a further object to provide a brake shoe which is simple in design and construction and adapted for commercial production and use.

Other and further objects will appear as the description proceeds.

I have illustrated certain preferred embodiments of my invention in the accompanying drawings, in which—

Figure 1 is a somewhat diagrammatic view showing my improved brake shoes applied to a wheel;

Figure 2 is an enlarged side view of one form of brake shoe;

Figure 3 is a section taken on line 3—3 of Figure 2, but on a somewhat enlarged scale;

Figure 4 is a fragmentary longitudinal section showing the intermediate web member;

Figure 5 is a plan view of Figure 2;

Figure 6 is a section taken on line 6—6 of Figure 2;

Figure 7 is a section taken on line 7—7 of Figure 2;

Figure 8 is a view similar to Figure 2, but showing a modified form of construction;

Figure 9 is a view similar to Figure 3, but showing a modified form of construction;

Figure 10 is a fragmentary section taken on line 10—10 of Figure 9;

Figure 11 is a view similar to Figure 10 but showing a modified form of construction;

Figure 12 is a face view of the left end of Figure 8;

Figure 13 is a fragmentary side view showing a modified form of operating end;

Figure 14 is a section taken on line 14—14 of Figure 13;

Figure 15 is a view similar to Figure 3, but on a smaller scale, showing a further modification; and Figure 16 is a section taken on line 16—16 of Figure 15.

Referring first to the forms of construction shown in Figures 1 to 7, the brake shoe comprises an integral pressed metal member having its central portion 21 bent to form two stiffening webs 22 and 23. The edges of the webs 22 and 23 are outturned to form the substantially cylindrical portions 24 and 25, the outer edges of these portions being reversely bent to form the stiffening flanges 26 and 27. A second member 28 spans the space between the cylindrical portions 24 and 25 and serves as an additional bearing surface for the brake lining 29. This member 28 is formed of lighter metal than the brake shoe member 21 and is preferably only spot welded to the member 21 at spaced points.

As shown in Figures 4 and 5, the member 28 is provided with transverse corrugations 30 to stiffen it laterally and as shown in Figure 5 it is provided with cut-away portions 31 which serve to weaken it longitudinally.

It has been found in forming a brake shoe of a pair of members welded together, that the stresses set up in the two members in the welding operation very often cause a twisting or deformation of the members. In this form of construction the shoe is in effect formed of a single member and the light bridging member 28 merely serves as a bearing for the brake lining. It is important that this member be strong transversely so that it will adequately support the brake lining and press it toward the brake drum. Due to the fact, however, that this member is lighter than the brake shoe member, is only secured to it at spaced points by spot welding or other means, and is weakened longitudinally, the member 28 will have no deforming or twisting effect upon the brake shoe proper when secured to it.

In the form of construction shown in Figures 1 to 7, the member 28 has its edges 32 seated in recesses 33 formed at the junction between the stiffening webs 22 and 23 and the cylindrical portions 24 and 25, thus bringing the outer surface of the member 28 into the plane of the cylindrical surfaces. As shown in Figure 3, depressions 34 are formed in the cylindrical portions at the points where the holes for the rivets 35 pass through, in order that the rivets may be forced down below the level of the brake lining 29.

Referring now to Figures 2 and 6, the brake member has a reinforcing member 36 fitted in its end to stiffen it at the point of engagement of the bearing fitting 37. This fitting 37 has the arms 38 embracing the end of the brake shoe member and secured thereto by means of the rivet 39. This rivet passes entirely through the flanges 22 and 23, as well as through the reinforcing member 36. The spacing member 40 is fitted upon the rivet 39 to support the parts. The end of the bearing fitting 37 is formed on an angle as shown at 41. This angular formation permits an adjustment of the brake shoe by moving axially of the wheel the fulcrum member 42 shown in Figure 1. The brake shoes are held against the fulcrum member 42 by means of the spring 43. The operating fittings 44 at the other end of the brake shoes are held against the operating lever head 45 by means of spring 46. The particular method of assembling the brake shoes in the wheel and of operating them, forms no part of the present invention and need not be described in detail herein.

Referring now to Figures 2 and 7, the operating fitting 44 is secured upon the end of the brake shoe by means of the nut 47 threaded upon the bolt or stud 48. This bolt or stud 48 is riveted or otherwise secured in the U-member 49 which in turn is riveted to the end of the brake shoe by means of rivet 50. This end of the brake shoe is provided with the reinforcing member 51 and the spacing sleeve 52 fits upon the rivet 50.

This form of construction permits the operating fitting 44 to be readily removed and replaced. This is of considerable importance, as although brake shoes are standard in certain sizes and widely used upon different makes of cars in these standard sizes, it is also customary to have different types of operating fittings on different cars. It will thus be possible to keep a small stock of brake shoes and to assemble thereon the necessary fittings when they are required for use.

Referring next to the form of construction shown in Figures 8, 9, 10 and 12, the brake shoe 53 is provided with the stiffening webs 54 and 55 similar in design to those shown in the preceding form of construction. These webs are outturned to form the cylindrical portions 56 and 57 and the thinner lining support 60 is secured upon the cylindrical portions by spot welding at spaced points, or by other similar means. The edges of the portions 56 and 57 are reversely bent, as shown at 58 and 59, to afford stiffening. The member 60 is shown as wider than the member 28 of Figure 3, and extends over a part of the faces of the cylindrical portions of the brake shoe.

It is desirable to have the brake linings 61 secured directly to the brake shoe and not to the member 60. In Figure 10, I have shown one method of securing it in this manner, the member 60 being provided with the opening 62 considerably larger than the size of the rivet 63 so that the rivet secures the brake lining 61 directly to the cylindrical portion 57 of the brake shoe.

An alternative form of construction is shown in Figure 11 and in this case the flange 57 of the brake shoe has the portion 64 countersunk an amount substantially equivalent to the thickness of the member 60, and fitting in the openings 62 in the member 60. The rivet 65 passes through the countersunk portion 64 and directly secures the lining to the brake shoe proper.

The bearing end 66 of the brake shoe 53 is formed by bending the metal of the brake shoe over an inner reinforcing member 67 to form a rounded bearing end. As shown in Figure 12, the end portion 66 is provided with the lateral shoulders 68 between which may be slipped a hardened bearing surface plate 69. In the form of construction shown in Figure 8, the operating end of the shoe is reinforced by an inner member 70 and is provided with recesses 71 having shoulders 72 at their inner ends against which bear the flanges 73 of the operating fitting 74. This member 74 is shown as formed of pressed metal, but it might obviously be a casting or a rolled section. The rivet 75 passes through the flanges 73 and secures the members 74 in place.

In Figures 13 and 14, I have shown an alternative form of securing the operating fitting in place. In this form of construction the brake shoe 76 has its end provided with the reinforcing member 77 and the rivet 78 secures the bolt 79 in place between the flanges. This bolt 79 receives the nut 80 which secures the fitting 81 in place upon the end of the brake shoe. This form of construction makes the fitting readily removable and replaceable in the same manner as the form of construction shown in Figure 7.

In the form of construction shown in Figures 15 and 16 the shoe is generally similar in design to that of Figure 3 and comprises an integral pressed metal member having its central portion 85 bent to form two stiffening webs 86 and 87. The edges of these webs are outturned to form the substantially cylindrical portions 88 and 89, the edges of which are reversely bent to form the stiffening flanges 90 and 91. The webs 86 and 87 are held firmly in spaced relation by a series of double ended rivets 92. These rivets are shown as having a heavy central portion which serves as a spacer, but obviously single ended rivets with a sleeve spacer may be used if desired.

The lining supporting member or members 93 are provided with downturned stiffening flanges 94 which are notched at 95 to fit over the rivets 92 and retain the members in place. These members 93 need not be otherwise secured to the brake shoe. It will be understood that since the members 93 are not a part of the shoe structure itself but merely serve as a backing for the central portion of the brake band, they may be formed of lighter material than the shoe.

It will be noted in the various forms of construction that the end fittings are shown as bearing against the ends of the portions forming the cylindrical surface and of the opposite face portion of the strengthening webs and not against the strengthening webs themselves. While this construction is considered preferable, it may be modified as circumstances may require.

While I have shown certain preferred embodiments by way of illustration of my invention, it is capable of further changes and modification to meet varying conditions, and I contemplate such variations as come within the spirit and scope of the appended claims.

I claim:

1. A brake shoe comprising a pressed metal member bent to form a double strengthening web and with its edges outturned in cylindrical form to receive a brake lining, an end fitting secured to an end of the shoe member, the end fitting having flanges overlying opposite faces of the shoe member, and recesses formed in the faces of the shoe member to receive said flanges.

2. A brake shoe comprising a pressed metal member bent to form a double strengthening web and with its edges outturned in cylindrical form to receive a brake lining, an end fitting secured to an end of the shoe member, the end fitting having flanges overlying opposite faces of the shoe member, and recesses formed in the faces of the shoe member to receive said flanges, the recesses being formed on the cylindrical surface and the opposite face of the strengthening web.

3. A brake shoe comprising a pressed metal member bent to form a double strengthening web and with its edges outturned in cylindrical form to receive a brake lining, and an end fitting secured to an end of the shoe member, the end fitting having flanges overlying opposite faces of the shoe member, the fitting engaging the ends of the cylindrical surface and of the opposite face portion of the strengthening web.

4. A brake shoe comprising a pressed metal member, having a stiffening portion and a cylindrical lining receiving portion, an end fitting secured to an end of the pressed metal member, the pressed member having recesses and shoulders thereon, and the end fitting engaging in the recesses and against the shoulders.

5. A brake shoe comprising a pressed metal member bent to form a double strengthening web and outturned cylindrical flanges, and an end fitting secured to an end of the pressed metal member, said fitting engaging the ends of the cylindrical portion and of the opposite face of the strengthening web and being spaced from the double strengthening web ends.

6. A brake shoe comprising a pressed metal member formed into a strengthening web and cylindrical lining receiving portions, an end of the shoe being reduced and rounded to form an integral bearing surface adapted to make line contact with the bearing.

7. A brake shoe comprising a pressed metal member formed into a strengthening web, cylindrical lining receiving portions, an end of the shoe being reduced and convexly rounded to form an integral bearing surface, and a reinforcing member enclosed within said bearing portion.

EDWIN R. EVANS.